(No Model.)
B. D. TABOR.
ROLLER BEARING.
No. 526,120. Patented Sept. 18, 1894.
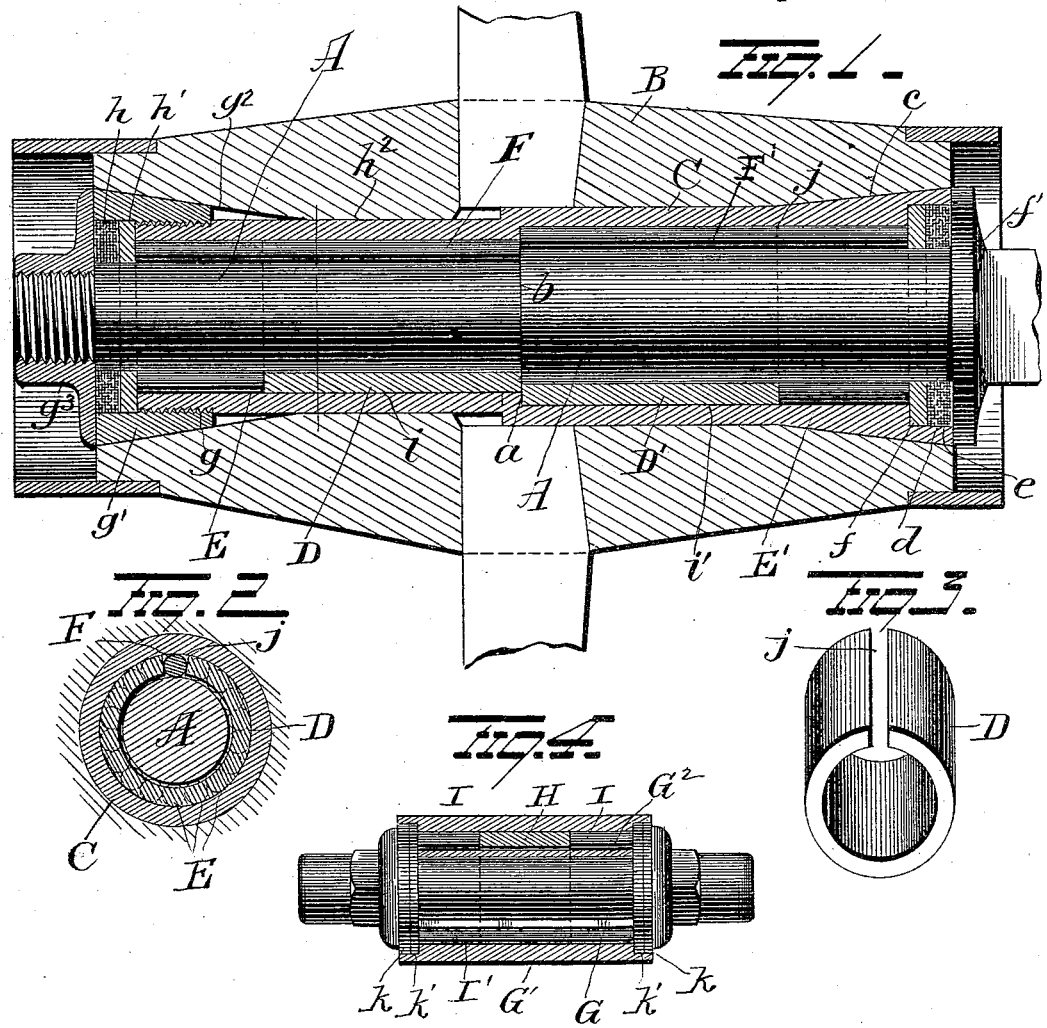

UNITED STATES PATENT OFFICE.

BYRON D. TABOR, OF WILSON, NEW YORK, ASSIGNOR OF THREE-FOURTHS TO E. F. BARTON AND A. N. DWIGHT, OF SAME PLACE.

ROLLER-BEARING.

SPECIFICATION forming part of Letters Patent No. 526,120, dated September 18, 1894.

Application filed December 14, 1893. Serial No. 493,640. (No model.)

*To all whom it may concern:*

Be it known that I, BYRON D. TABOR, a citizen of the United States, residing at Wilson, in the county of Niagara and State of New York, have invented certain new and useful Improvements in Roller-Bearings; and I do hereby declare the following to be a full, clear, and exact description of the invention, such as will enable others skilled in the art to which it appertains to make and use the same.

My invention relates to an improvement in roller bearings,—the object of the invention being to construct a roller bearing in such manner that the rollers will be prevented from any spiral movement and maintained parallel with the axis of the shaft or axle.

A further object is to produce a roller bearing which shall be simple in construction and effectual in the performance of its functions.

With these objects in view the invention consists in certain novel features of construction and combinations and arrangements of parts as hereinafter set forth and pointed out in the claims.

In the accompanying drawings: Figure 1 is a sectional view of a hub and axle showing the application of my invention. Figs. 2 and 3 are detail views. Figs. 4 and 5 are views of modifications.

A represents an axle journal, and B a hub. Located within the hub and encircling the journal is a casing C, one half of which is of a larger diameter than the other half, thus producing an annular shoulder $a$ midway between the ends of said casing. The axle journal A is also so constructed that one half will be of a greater diameter than the other half, thereby producing an annular shoulder $b$ aligning with the annular shoulder $a$ of the casing. At its inner end, the casing C is somewhat enlarged (or wedge-shaped in cross section), as at $c$ and the inner end of the interior of the hub is also enlarged to receive said enlarged portion $c$ of the casing. The inner end of the casing C is also cut away to produce a chamber $d$ for the accommodation of washers $e, f$, the washer $e$ being preferably made of elastic material and the washer $f$ being made of steel and these washers will be prevented from escape by means of a flange $f'$ on the axle at the inner end of the journal A.

The outer end of the casing C is provided exteriorly with screw threads $g$ for the accommodation of an interiorly screw threaded ring $g'$. A nut $g^3$ is screwed on the end of the axle journal A and bears at its outer edge upon the outer end of the ring $g'$. The interior of the larger portion of the ring $g'$ is made tapering or wedge shaped in cross-section, and adapted to fit tightly within a similarly shaped recess or chamber $g^2$ made in the outer end of the hub. Between the end of the casing C and the end of the ring $g'$ washers $h$ $h'$ are inserted, the washer $h$ being of elastic material and the washer $h'$ being of steel, these washers being held in place by the nut $g^3$. One portion of the casing C being made of greater diameter than the other portion, a space will be formed between the smaller portion of the casing and the hub, and for this reason the hub is made with an inner annular flange $h^2$ which abuts against the smaller portion of the casing.

From the construction and arrangement of parts above described, it will be seen that between the interior of the casing C and the journal A, chambers $i, i'$ are formed. In the space, or chamber $i$, coincident with the smaller portion of the casing, a sleeve D, having a longitudinal slot or slit $j$, is located and adapted to bear against the annular shoulder $b$ of the journal. The sleeve D is of a length less than the length of the smaller portion of the casing, and in the space $i$, between the end of the sleeve D and the outer end of the casing, a series of anti-friction rollers E is located. A long roller F is also located in the slot or slit $j$ in the sleeve D, and extends from the outer end of the casing to the shoulder $b$ on the journal A, said long roller, with the rollers E, constituting an annular series about the journal, and one end of all of said rollers terminating in close proximity to or bearing against the washer $h'$. A slotted sleeve D' is located in the space $i'$ and normally bears at one end against the annular shoulder $a$ of the casing C. Between the opposite end of the sleeve D' and the end of the casing, a series of rollers E' is located, and in the slot of the sleeve D', a long roller F' is located and extends from the annular shoulder a to the end of the hub box, all of said rollers being adapted to bear against the washer f. By positively retaining one of the rollers of each series parallel with the axis of the journal A by means of the slotted sleeve, the balance of the rollers, will thereby be maintained in such parallel relation to said journal and their spiral movement will be effectually prevented, thus overcoming a very serious defect heretofore encountered in roller bearings.

Fig. 4 illustrates the application of my invention, where a wheel revolves on a stationary shaft. In this form of the invention, the stationary axle is represented at G, and the hub of the wheel (or pulley as the case may be) is designated by G'. A sleeve $G^2$ is located on the shaft G, and is slotted so that it can be expanded (by means of a wedge or otherwise) in order to compensate for wear of the rollers, which will be presently described. A slotted sleeve H is located within the hub G' centrally between its ends and encircles the sleeve $G^2$. A series of antifriction rollers I is located at each side of said sleeve, and each series of rollers have their bearing against the end thereof. A long roller I', of a length equal to the length of the two series of rollers and the sleeve H, is located in the slot of the sleeve H, and completes the two annular series of rollers,—the long roller serving, as in the form of the invention above described, in maintaining all the rollers parallel with the axis of the shaft. Washers k, k' are located at the respective ends of the hub.

In Fig. 5 an application of the invention to a revoluble shaft in a stationary case is shown. In this form of the invention a casing J is shown, having a slot l, and at each side of said slot, lugs l' are located, through which a screw $l^2$ is adapted to pass. Within the casing J, a slotted bushing L is located, and within said bushing is a slotted sleeve M, through which the revoluble shaft M' passes. A series of rollers N is located at each end of the sleeve M, and a long roller N', equal in length to both series of rollers and the slotted sleeve, is adapted to pass through the slot in said sleeve, and serves to retain all the rollers parallel with the axis of the shaft in the same manner as above explained. By tightening the screw $l^2$, it will be seen that the casing and the bushing can be contracted, thus compensating for wear.

Washers o, o', are located at the respective ends of the casing.

My improvements are simple in construction, cheap to manufacture, and effectual in the performance of their functions.

Having fully described my invention, what I claim as new, and desire to secure by Letters Patent, is—

1. A bearing comprising a journal, a casing surrounding the journal, a split or slotted sleeve, rollers at one end of said split sleeve bearing upon the journal and abutting on the end of the sleeve, and a long roller extending through the split sleeve, substantially as set forth.

2. A bearing comprising a journal, a casing surrounding the journal, a split sleeve surrounding the journal and interposed between the latter and the casing, rollers at one end of the sleeve, means at the outer end of the rollers to retain them in place, and a long roller lying in the slit or slot in the split sleeve and extending between the other rollers, substantially as set forth.

3. The combination, with a casing having an annular shoulder between its ends, and a shaft or axle having an annular shoulder between its ends, of two sleeves located in said casing and bearing respectively against said annular shoulders, each of said sleeves being slotted longitudinally, rollers between the ends of said sleeves and the ends of the casing, and a long roller in the slot of each sleeve, each long roller constituting one of each first mentioned series of rollers, substantially as set forth.

4. The combination with a casing having a diameter larger at one end than at the other and a shaft or axle having a larger diameter at one end than at the other, sleeves located in both parts of the casing and each having a longitudinal slot, a series of rollers coincident with the end of each sleeve, and a long roller in the slot of each sleeve and constituting one of said first mentioned series of rollers, substantially as set forth.

5. The combination with a hub and axle, the bore of the hub tapering at one end, of a hub box screw threaded at one end, a ring having a tapering exterior, said ring adapted to screw on the threaded end of the hub-box and fit the tapering end of the hub bore, a nut adapted to screw on the end of the axle and bear on the ring, and a washer in the space or chamber formed between the nut and the hub box and surrounded by the ring, substantially as set forth.

In testimony whereof I have signed this specification in the presence of two subscribing witnesses.

BYRON D. TABOR.

Witnesses:
C. Y. DOX,
H. SANFORD.